UNITED STATES PATENT OFFICE.

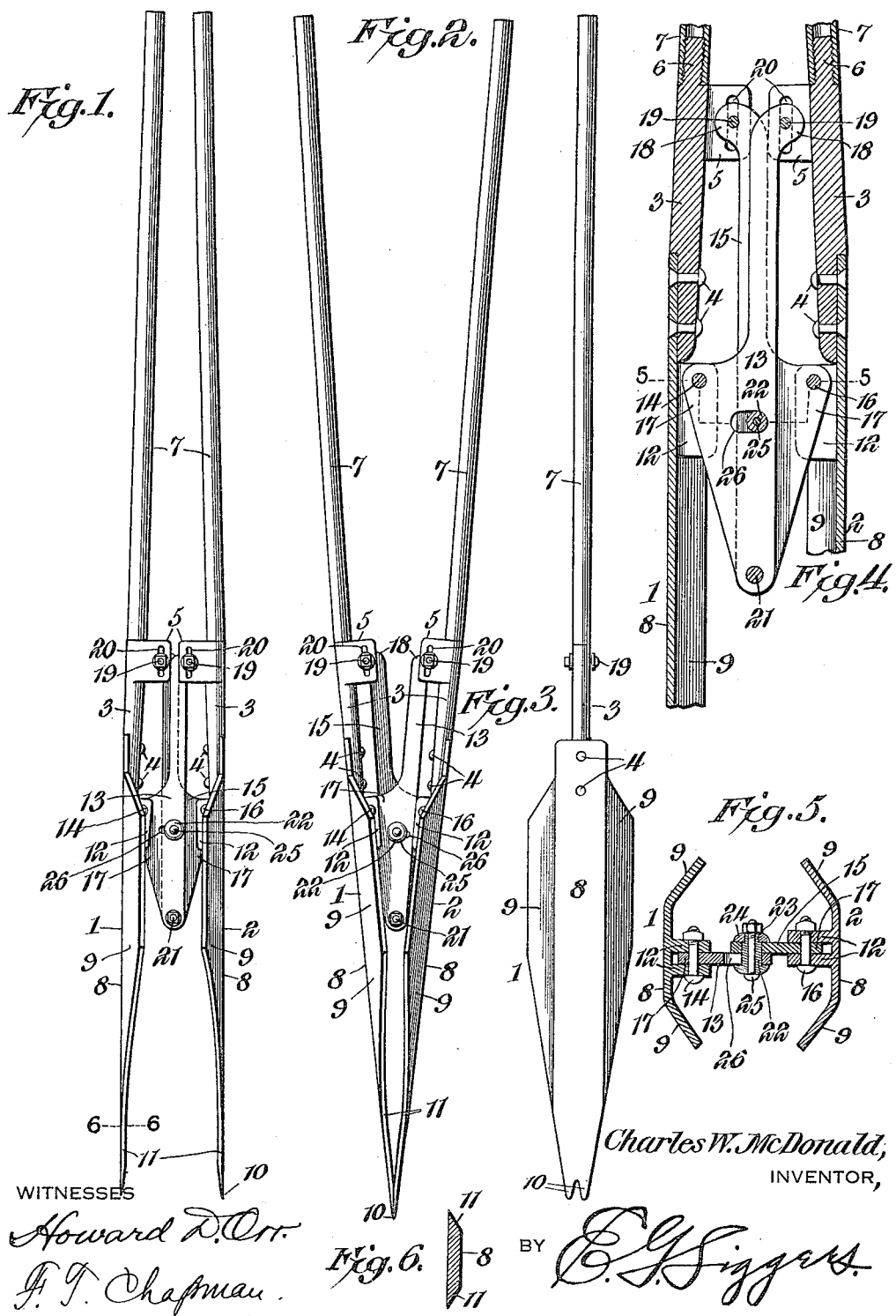

CHARLES WALTON McDONALD, OF GALLATIN, MISSOURI, ASSIGNOR OF ONE-HALF TO CLARENCE W. CONNALLY, OF AUSTIN, TEXAS.

POST-HOLE DIGGER.

1,168,405.

Specification of Letters Patent. Patented Jan. 18, 1916.

Application filed April 16, 1915. Serial No. 21,699.

*To all whom it may concern:*

Be it known that I, CHARLES W. McDONALD, a citizen of the United States, residing at Gallatin, in the county of Daviess and State of Missouri, have invented a new and useful Post-Hole Digger, of which the following is a specification.

This invention has reference to post hole diggers and its object is to provide a post hole digger wherein the blades may be appropriately spread apart without any great spread of the handles.

In accordance with the present invention, which is designed more particularly for digging post holes under such conditions as are found in the black land in the State of Texas, the blades are long, slim and thin, and taper toward the digging end where they terminate in teeth somewhat similar to saw teeth.

The handles carrying the blades are pivoted together by means of lever connections in turn pivoted together and to the blades at some distance from the connections of the levers to the handles, while the levers at the ends remote from the handles have their pivot connections nearer to the points of the blades than where the levers are pivoted to the blades. The result of the construction is that the blades are spread apart for digging and are approached for lifting dirt from the hole with a minimum extent of travel of the handles so that even when the handles are spread apart to their greatest extent at the manipulating ends, thereby bringing the points of the blades together, such spread is of but moderate extent, wherefore the digger may be employed in deeper holes than is customary.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings: Figure 1 is an edge elevation of a post hole digger with the blades separated. Fig. 2 is a similar view with the blades approached. Fig. 3 is a view taken at right angles to the showing of Fig. 1. Fig. 4 is a longitudinal section with the lever connections shown in elevation. Fig. 5 is a section on the line 5—5 of Fig. 4. Fig. 6 is a section on the line 6—6 of Fig. 1 but drawn on a larger scale.

Referring to the drawings there are shown two blades 1, 2, each provided with a shank 3 to which the blade is riveted or otherwise secured, rivets 4 being shown, and at the end of each shank remote from the blade said shank is formed into ears 5. Each shank 3 terminates in a nipple 6 to which is attached a handle 7 preferably though not necessarily, of metal pipe. The handles are of course made appropriately long and may be longer or shorter in proportion to the lengths of the blades 1 and 2 than indicated in the drawing.

Each blade 1 and 2 is relatively slim, that is, the blade is quite long in comparison with its breadth. Moreover, each blade is shown as composed of a long central flat portion 8 and side wings 9, the latter being arranged at an angle to the plane of the central portion 8. This produces a blade of more or less concavity in cross-section, and the concave faces of the blades are presented one toward the other. The central portion 8 is of greater length than the wings 9, which latter taper toward the end of the blade remote from the handle and the central portion 8 of each blade continues in taper form to the extremity of the blade where the central portion 8 terminates in teeth 10 extending longitudinally of the blade. The teeth 10 constitute the entering or cutting end of the blade. The tapering or approaching edges of the wings 9, as well as the tapering extremities of each blade 1 and 2 are beveled, as indicated at 11 in Fig. 6, so as to provide cutting or shearing edges adapted to facilitate the formation of the hole.

While the blades 1 and 2 are shown as of more or less angular cross-section they may be more in conformity in cross-section with the usual round shape of a post hole, and the blades may be described as concave on the inner faces and convex on the outer faces.

On the inner face of each blade near the butt end there is a pair of ears 12 either formed on the blade or appropriately secured thereto. In the ears 12 of the blade 1 there is secured a lever 13, by means of a pivot 14, which pivot may be in the form of a bolt or be of other form. Secured between the ears 12 of the blade 2 is a similar lever 15 held to the ears by a pivot 16 similar to the pivot 14. Each lever near one end has a lateral offset 17 through which the pivot 14 or 16, as the case may be, extends, so that the point at which the lever is pivoted to the respective blade 1 or 2 is considerably to one side of the longitudinal center line of the lever. That portion of the lever pivoted to the blade 1 or 2 is located between the ends of the lever and somewhat nearer one end than the other, so that one end of each lever extends between the blades toward the pointed ends of the blades, while the other end of each lever extends toward and ultimately between the ears 5, said end of the lever being bent to one side, as indicated at 18, and being secured to the corresponding ears 5 by a pivot pin or bolt 19, said ears having elongated slots 20 for the passage of the bolt 19. The other ends of the levers 13 and 15 are connected together by a pivot pin or bolt 21, and between the ends of the levers, and preferably between the pivots by which the levers are attached to the blades and the pivot 21, the levers are joined by a headed pivot sleeve 22 having the end remote from the head reduced to form a neck 23 to which is applied a laterally expanded washer 24 similar to the headed end of the sleeve. A bolt 25 or other suitable holding device is extended through the sleeve to hold the washer 24 against the corresponding lever with the head of the sleeve bearing against the other lever. One of the levers, say, the lever 13, has a laterally elongated slot 26 where traversed by the sleeve 22, so that at such point one lever may move laterally with respect to the other when rocked upon the pivot 21. The purpose of the sleeve 22 is to hold the two levers in face to face engagement, so that sluing of the levers or lateral movements of the blades are avoided.

When it is desired to use the post hole digger the handles 7 are approached as shown in Fig. 1. This results in a spreading apart of the blades 1 and 2 until they are in approximately parallel relation, the approach of the handles being arrested by the engagement of the then upper ends of the levers 13 and 15 with the particular ears 5 in their paths. When the digging is performed the ends of the blades are forced into the ground, such movements being facilitated by the teeth 10 and the beveled edges 11 which produce relatively sharp cutting edges on the blades. When sufficient ground has been loosened it is desirable to cause the blades to approach so as to confine the loosened earth between them in order to lift the earth from the forming hole. This is accomplished by separating the free ends of the handles 7, whereupon the handles and blades rock about the pivot 21 as a center, this pivot being located nearly half way down the blades considering the digger as in operative position. The ears 5 and corresponding ends of the levers, situated quite a distance from the pivot 21, separate and cause a corresponding separation of the upper ends of the levers, which latter being in face to face relation move one upon the other where connected by the sleeve 22, the slot 26 admitting of such movement. The described movement of the levers causes an approach of the pivots 14 and 16 and the corresponding approach of those portions of the blades provided with the ears 12. The result of the action of the levers is that the approaching and receding movements of the pointed or active ends of the blades is relatively rapid as compared with the movements of the handles, since the pivot point of movement is at the pivot 21 and the movements of the blades are modified by the approach of the ears 12 toward each other as the ears 5 recede, or the movements of the ears 12 away from each other as the ears 5 approach. This acceleration of movement of the pointed ends of the blades with respect to the movements of the free ends of the handles produces the complete movement of the blades toward or from each other with a minimum of movement of the free ends of the handles, which movement is much less than would be the case if the pivot connections between the blades were in the usual position corresponding to the upper ends of the blades.

The compound pivot connection between the two handles and blades constitutes a structure in which all the pivots have more or less transitional movement when the parts connected by them are moving about the axes of the respective pivots. The handles are in straight lines with the blades and the latter are long and slim as compared with the blades of post hole diggers as usually constructed. The arrangement is such that a hole may be dug considerably deeper than with ordinary post hole diggers of the general type of the present invention without the handles interfering.

What is claimed is:—

1. A post hole digger provided with elongated relatively narrow blades with handles in line therewith and levers pivoted together and to the handles and blades and constituting the connections upon which the handles and blades may be rocked.

2. A post hole digger comprising handles and blades, levers each connected to the other at one end by a pivot connection and at the other ends connected to the handles in spaced relation to the blades, and said levers having lateral offsets between the ends pivotally connected to respective blades.

3. A post hole digger comprising handles and blades, levers each connected to the other at one end by a pivot connection and at the other ends connected to the handles in spaced relation to the blades, and said levers having lateral offsets between the ends pivotally connected to respective blades, said levers overlapping between the ends and there provided with a slidable uniting device.

4. A post hole digger having elongated relatively narrow blades with handles in line with the blades and fast thereto, the blades and handles being provided with ears with those of the blades spaced from those of the handles in the direction of the length of the handles, levers each slidably pivoted to a respective handle by the ears thereon and to the blade carried by the other handle by means of the ears on said blade, said levers being pivoted together at the ends remote from those pivoted to the handles and at a point nearer to the digging ends of the blades than where pivotally connected to the blades, and means for holding the levers in face to face engagement and permitting movements of the levers one on the other about the pivotal connection of the levers one with the other.

5. A post hole digger comprising blades and handles fast to and in line with the respective blades, and lever connections between each handle and the opposite blade and said lever connections being pivotally connected together between the blades at a point nearer to the cutting ends of the blades than where the levers are connected to said blades.

6. A post hole digger comprising a pair of blades each provided with a handle and a pivotal connection between the blades comprising joined levers connected together and each lever being connected to one handle and the opposite blade, the point of connection between the levers being closer to the cutting ends of the blades than where the levers are connected to the respective blades.

7. A post hole digger comprising a pair of blades each provided with a handle and a pivotal connection between the blades comprising joined levers connected together and each lever being connected to one handle and the opposite blade, the point of connection between the levers being closer to the cutting end of the blades than where the levers are connected to the respective blades, said levers being arranged face to face with the blades and there provided with a connection holding the levers in such face to face engagement with the connection slidable with relation to the levers to compensate for changing positions of the levers with respect one to the other in their movements about their pivotal connection to each other.

In testimony, that I claim the foregoing as my own, I have hereto affixed my signature in the presence of two witnesses.

CHARLES WALTON McDONALD.

Witnesses:
GEORGE AID,
N. S. GIVENS.

Copies of this patent may be obtained for five cents each, by addressing the "Commissioner of Patents, Washington, D. C."